United States Patent [19]

Rasmussen

[11] Patent Number: 4,997,310

[45] Date of Patent: Mar. 5, 1991

[54] PORTABLE FLOATING WAVE DISSIPATING DEVICE

[76] Inventor: Frederick T. Rasmussen, 6451 Elmwood Ave., Sarasota, Fla. 34232

[21] Appl. No.: 464,987

[22] Filed: Jan. 16, 1990

[51] Int. Cl.⁵ ............................................... E02B 3/06
[52] U.S. Cl. ........................................ 405/26; 405/28; 405/21
[58] Field of Search .................... 405/26, 27, 28, 23, 405/21, 25, 30

[56] References Cited

U.S. PATENT DOCUMENTS

| | | | |
|---|---|---|---|
| 4,234,266 | 11/1980 | Angioletti | 405/26 |
| 4,364,691 | 12/1982 | Wirt | 405/26 |
| 4,715,744 | 12/1987 | Richey | 405/26 |
| 4,768,896 | 9/1988 | Moore | 405/26 |
| 4,850,742 | 7/1989 | Bouchet et al. | 405/26 |

Primary Examiner—Dennis L. Taylor
Assistant Examiner—J. Russell McBee

[57] ABSTRACT

A portable floating wave dissipating device particularly useful when deployed to protect a beach area during storm periods. The device includes (a) a floating platform, (b) a pivotally connected exposed upper water breaking surface which dissipates the visible portions of oncoming waves, and (c) a pivotally connected submerged lower vane breaking the surface which dissipates the sub-surface portions of oncoming waves. The submerged water breaking surface may also include vanes for redirecting sea water flowing therethrough either upwardly or downwardly to enhance movement of subsurface sediment and sand toward the beach area.

10 Claims, 2 Drawing Sheets

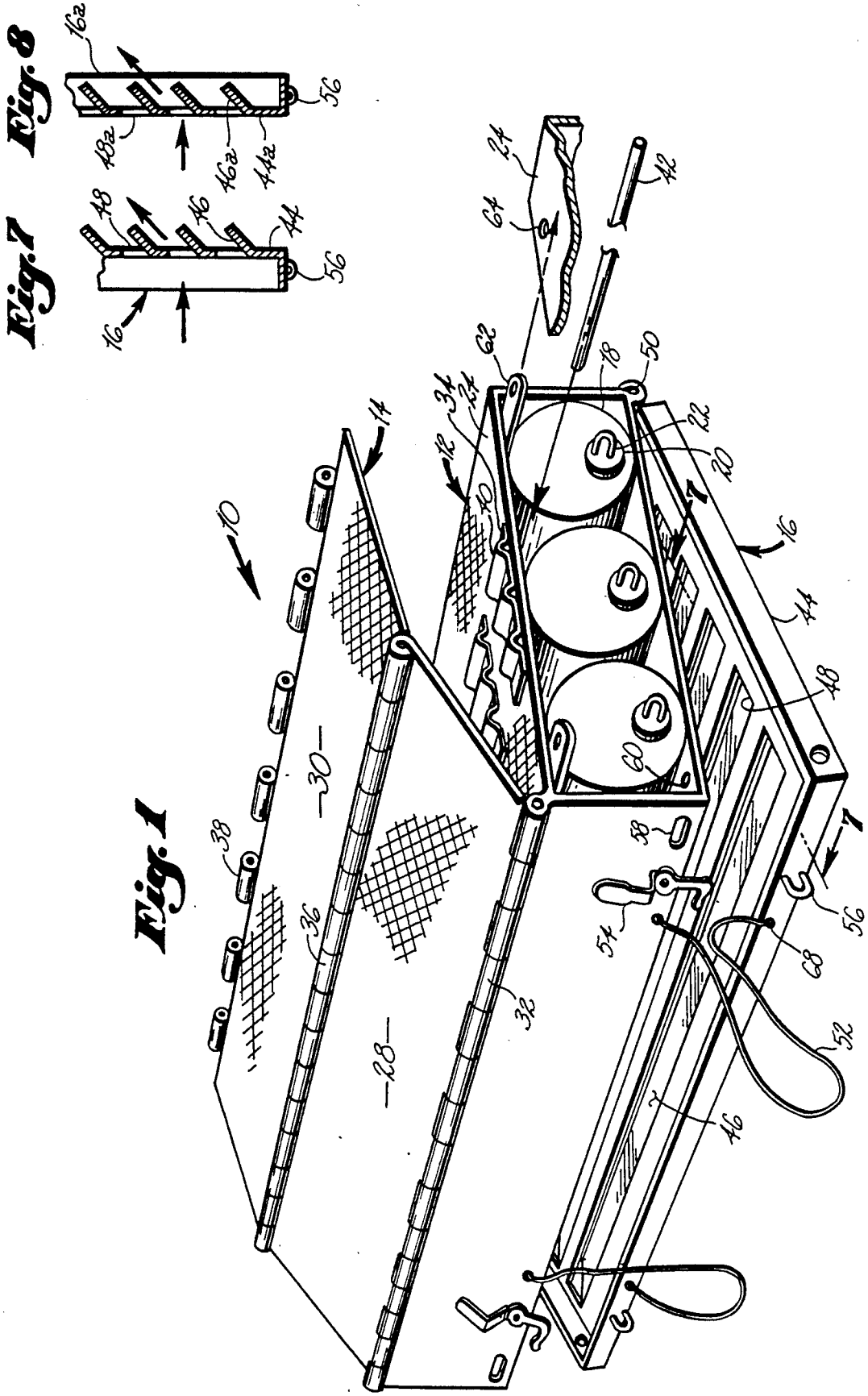

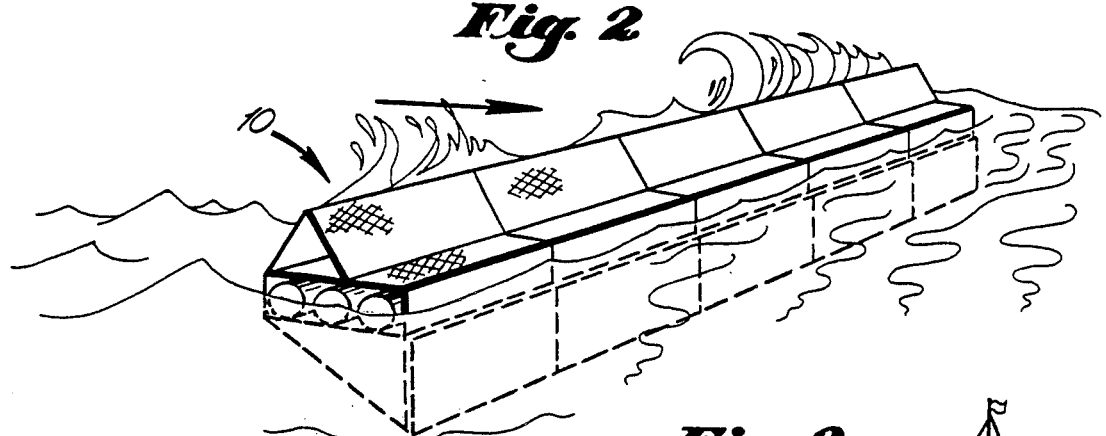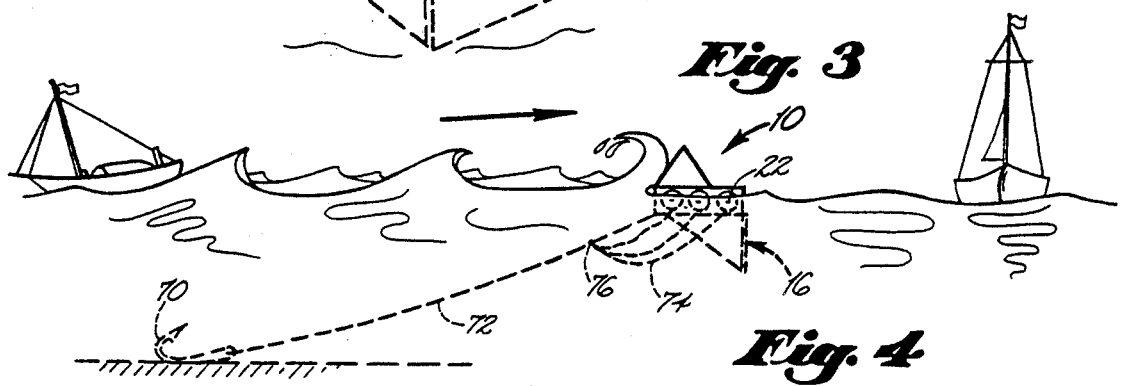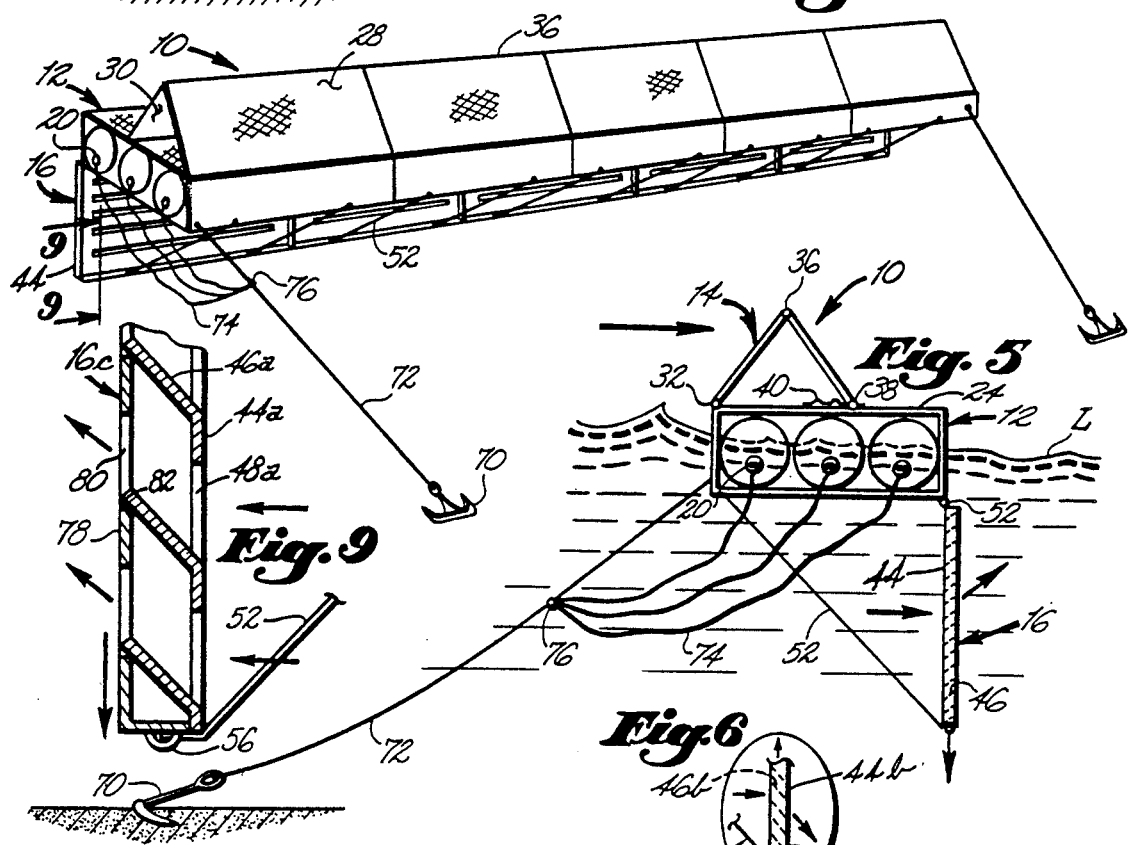

PORTABLE FLOATING WAVE DISSIPATING DEVICE

BACKGROUND OF THE INVENTION

This invention relates generally to breakwaters, and more particularly to a floating breakwater useful for preservation and reconstruction of beaches.

Considerable inventive effort has been expended in developing breakwater systems to protect our shorelines. This effort is obviously as a result of the significant deterioration that our country, particularly, is experiencing during periods of storms and high tides. Some of our prominent shorelines have retreated drastically over time.

The following U.S. Patents are directed to floatable or floating devices which are located, or are deployable, at some distance from a beach or protected structure and facing the oncoming waves so as to diminish their strength:

| | |
|---|---|
| 3,222,870 | H. F. Miller, et al. |
| 3,222,871 | H. F. Miller, et al. |
| 3,628,334 | Coleman |
| 3,673,805 | Szyfter |
| 3,691,774 | Hard |
| 3,846,990 | Bowley |
| 3,863,455 | Fuller |
| 3,864,920 | Tazaki, et al. |
| 3,877,233 | Olsen |
| 3,884,042 | Anderson, et al. |
| 3,952,521 | Potter |
| 3,953,977 | Kikui, et al. |
| 3,991,576 | Tazaki, et al. |
| 4,023,370 | Watson |
| 4,048,802 | Bowley |
| 4,098,086 | Detsy, et al. |
| 4,136,994 | Fuller |
| 4,234,266 | Angioletti |
| 4,712,944 | Rose |
| 4,715,744 | Richey |
| 4,776,724 | Isozaki |
| 4,824,286 | Waas |

A number of other more dissimilar patented devices are known to applicant which are also directed to diminishing the impact of high wave action on beaches and land-based structures as follows:

| | |
|---|---|
| 3,200,598 | J. C. Krepak |
| 3,237,414 | L. G. Straub, et al. |
| 3,276,210 | R. L. Stitt |
| 3,357,192 | G. Hibarger |
| 3,426,537 | H. H. Chenoweth, et al. |
| 3,465,528 | E. M. Usab |
| 3,487,645 | E. G. Frankel |
| 3,533,240 | E. J. Lesh |
| 3,534,558 | G. LeBouteiller |
| 3,595,026 | Scholi |
| 3,791,150 | Tachii |
| 3,800,543 | Moore |
| 3,848,419 | Bowley |
| 3,971,221 | Greenleaf |
| 4,006,598 | Hulsemann |
| 4,174,185 | Toki |
| 4,264,233 | McCambridge |
| 4,364,691 | Wirt |
| 4,406,564 | Hanson |
| 4,407,607 | McCambridge |
| 4,693,631 | McKay |
| 4,768,896 | Moore |
| 4,850,742 | Bouchet, et al. |

The above U.S. Patents, however, are somewhat removed from the structure and function of that of the present invention.

To further typify the degree to which others have addressed the issue of diminishing the damaging effects of storm waves, the following U.S. patents are directed to substantially dissimilar devices from that of the present invention but are nonetheless intended to protect land-based objects and shorelines:

| | |
|---|---|
| 3,085,404 | A. L. Smith |
| 4,468,151 | Warlick |

The present invention is directed to a simple and easily deployable device and system which is structured for floatation directly facing oncoming waves along a beach area. Deployment is in two stages: First, each device is towed to the area of protection in its fully collapsed orientation, and then interconnected one to another to form an entire breakwater system. Anchors are used to retain the system in position. Thereafter, the upper and lower portions may be further deployed or errected in timely fashion just prior to the peak of a storm or hurricane.

BRIEF SUMMARY OF THE INVENTION

This invention is directed to a portable floating wave dissipating device particularly useful when fully deployed to protect a beach area during storm periods. The device includes (a) a floating platform, (b) a pivotally connected exposed upper water breaking surface which dissipates the visible portions of oncoming waves, and (c) a pivotally connected submerged lower vane breaking the surface which dissipates the sub-surface portions of oncoming waves. The submerged water breaking surface may also include vanes for redirecting sea water flowing therethrough either upwardly or downwardly to enhance movement of subsurface sediment and sand toward the beach area.

It is therefore an object of this invention to provide an easily deployable floating wave dissipating device for temporary use in protecting beach areas from erosion during periods of high waves and storms.

It is another object of this invention to provide a portable floating wave dissipating device which may be transported from a remote stored location by towing and then assembled into an elongated wave dissipating system for the protection of a long stretch of beach area.

It is yet another object to provide the above invention which will both dissipate oncoming waves and also help to place sediment and sand into suspension for movement toward the beach area.

It is yet another object of the above invention to be self-submerging in the event of disconnection from the anchor means so as to prevent the device from being deposited on the beach area.

In accordance with these and other objects which will become apparent hereinafter, the instant invention will now be described with reference to the accompanying drawings.

BRIEF DESCRIPTION OF THE DRAWINGS

FIG. 1 is a perspective view of the preferred embodiment of the invention in its partially open configuration.

FIG. 2 is a pictorial view of a plurality of the devices connected to form an elongated system in use.

FIG. 3 is an end elevation view of FIG. 2.

FIG. 4 is a perspective view of the invention as shown in FIG. 4.

FIG. 5 is a detailed end elevation view of FIG. 4.

FIG. 6 is an alternate orientation of vanes contained within the submerged water breaking surface (16) of FIG. 5.

FIG. 7 is a section view in the direction of arrows 7—7 in FIG. 1.

FIG. 8 is an alternate embodiment of FIG. 7.

FIG. 9 is a view in the direction of 9—9 in FIG. 4 except showing an alternate embodiment thereof.

DETAILED DESCRIPTION OF THE INVENTION

Referring now to the drawings, and particularly to FIGS. 1 to 5, the preferred embodiment of the invention is shown generally at numeral 10. This device 10 includes (a) a floating platform 12, a hinged, (b) two-panel, exposed wave breaking surface 14, and (c) a submerged, lower wave breaking panel 16.

The platform 12 includes a plurality of elongated cylindrical tubular water tight chambers 18 which are connected within an elongated rectangular frame 24. Each of the water tight chambers 18 include a detachable plug 20 having connecting strap 22 as shown to function as will be herebelow described. Sizing of the chambers 18 is such that, when plugs 20 are removed, the entire device 10 will quickly become submerged and sink to the bottom when the cylinders 18 are filled with water.

The upper or exposed water breaking surface 12 includes two rigid panels 28 and 30 which are hinge connected one to another along hinge 36 and are generally coextensive with the floating platform 12. Panel 28 is hinge connected along hinge 32 to the upper margin of the leading surface of rectangular frame 24. (The leading surface is referred to as that which directly encounters oncoming waves.) Panel 30 includes hinge portions 38 which are matably engagable within ridges 40 formed into bands 34 connected on the top surface of rectangular frame 24 as shown. By pivotally positioning panels 28 and 30 about hinges 32 and 36, a choice may be made with respect to the particular alignment of hinge portions 38 and one of the ridges 40 of band 34. As best seen in FIGS. 1 and 5, after the particular selection is made which determines the angular positioning of panels 28 and 30, shaft 42 is then slid through aligned hinge portion 36 and one ridge 40 so as to lockably secure the arrangement.

The lower or submerged water breaking surface 60 is formed of a rigid flanged panel 44 which is pivotally connected along shaft 50 to the lower edge of the trailing surface of frame 24. Clasp 54 which interengages loop 56 locks panel 44 in its closed position when not in use. Thus, when released, the submerged water breaking surface 16 freely swings downwardly into the orientation shown in FIGS. 2 to 5. A flexible, nonextendable cable 52 is connected between the lower edge of the leading surface of perimeter frame 24 and the distal edge of panel 44 as best seen in FIG. 1 so that the submerged water breaking surface 16 cannot travel further than into its downwardly orientation.

In operation, the leading edge of the floating platform 12 is exposed to oncoming waves which are typically higher than the out-of-water height of the floating platform 12. The majority of the upper or visible portion of the oncoming waves as best seen in FIGS. 2 and 3, strike against panel 28 causing considerable force thereagainst. Anchor 70 connected by anchor line 72 which interengages through apertures 58 and connected at 62 to the frame 24 serve to secure the positioning of the floating platform 10 in the face of oncoming waves.

Because a significant portion of wave action is beneath the surface of the water, the submerged water breaking surface 16 also serves to dissipate wave energy. Panel 44, which includes a plurality of spaced longitudinal slots 48 formed therethrough over substantially the entire length of panel 44, serves to meter or restrict sea water flow therethrough in the direction of the arrow in FIG. 5. Vanes 46 are formed adjacent one longitudinal margin of each slot 48 by the simple shearing and bending of the main portion of panel 44 as best seen in FIG. 7 and also serve to redirect the sea water flowing through slots 48 upwardly. These vanes 46 then serve to apply a downwardly force on submerged water breaking surface 16 as shown in FIG. 5. Additionally, the upwardly redirected sea water helps to further dissipate the energy of the submerged portion of the oncoming waves.

Because the submerged wave breaking surface 16 is free to swing toward its closed position, any reverse or seaward flow of water against the opposite surface of panel 44 results in the free or swinging pivotal action of panel 44 toward its closed or horizontal position about hinge 52.

In the unlikely event that anchor line 72, or its attachment to perimeter frame 24 through apertures 58 is insufficient to maintain the positioning of the device 10 parallel to but away from the beach area a sufficient amount so as to utilize the effectiveness of the device, drainage plugs 20 are provided with brackets 22 which are interconnectable to one end of tether lines 74. Tether lines 74 are connected at their other end to a mid point 76 along anchor line 72, but are sized so as to be slack as shown in FIGS. 4 and 5 during normal operation when the anchor line 72 is taught. However, should the anchor line 72 become detached or break away from the floating platform 12, tether lines 74 then tension strenuously against oncoming wave action and pull plugs 20 free from watertight cylinders 18. The size of plugs 20 are such that tanks 18 will rapidly fill with water when removed so that the device 10 will sink to the bottom before reaching the beach area.

Referring now to FIG. 8, an alternate configuration for vanes 46a is there shown wherein panel 44 includes slots 48a which have vanes 46a positioned inwardly with respect to the flange formed into panel 44a. In this embodiment 16a, oncoming sea water passing through slots 48a in the direction of the arrow is upwardly disposed by vanes 46a as shown.

Referring now to FIG. 6, vanes 46b may alternately be downwardly disposed whereby oncoming sea water passing through the slots into panel 44b are downwardly disposed in the direction of the arrow as shown. By this arrangement, then sea water downwardly redirected when the lower edge of the submerged water breaking surface 16 is relatively close to the bottom, will serve to stir sediment and sand into the sea water which is moving toward the beach. Normally, because of the depth at which the device 10 is placed, sediment and sand are not disturbed significantly until the wave reaches closer to the shore and begins to crest. However, if sediment is disrupted and raised into the oncoming sea water resulting from the downwardly flow created as shown in FIG. 6, some beach build up may occur by this action.

Referring now to FIG. 9, an alternate structure for the submerged water breaking surface is shown generally at numeral 16c. This embodiment 16c includes the same formed panel 44a as described with respect to FIG. 8 wherein vanes 46a redirect sea water flowing through slots 48a upward in the direction of the arrow. However, this embodiment 16c also includes an additional panel 78 having slots 80 which are generally in alignment with slots 48a but shifted upwardly. By this arrangement, vanes 46a contact the lower margin of slots 80 at 82 so as to obtain additional support and strength for this arrangement.

In practical terms, a plurality of these devices 10 will be needed to form an elongated breakwater system as best shown in FIGS. 2 and 4. Rectangular frame 24 as best seen in FIG. 1, includes brackets 62 which is connectable by mechanical fastening means to apertures 64 in the opposite end of another rectangular panel 24. Therefore, once the devices 10 are towed by boat to the anchoring site, the elongated system containing a plurality of the devices 10 may easily be assembled.

Storage during towing and during periods of non-use while anchored in place is made easy by the removal of bar 42 whereupon the exposed water breaking surface 14 is allowed to fold downwardly against the top surface of rectangular frame 24. Likewise, the submerged water breaking surface 16 may be pivoted upwardly and latched by latch 54 into bracket 56 so that the entire arrangement represents relatively low resistance to wave action for towing or resting in place when not in use.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A portable floating wave dissipating device for reducing beach erosion during periods of high wave action against a beach or coastal area, comprising:
    a floating platform having a top and bottom surface;
    an exposed wave breaking surface connected along one longitudinal edge of, and generally coextensive with, said top surface, said exposed wave breaking surface upwardly dispositionable at acute angle to said top surface;
    a submerged wave breaking surface connected along one longitudinal edge of, and generally coextensive with, said bottom surface, said lower wave breaking surface downwardly positionable at a generally right angel to said bottom surface;
    said submerged wave breaking surface having a plurality of spaced slots formed therebetween for dissipating wave action passing through said slots.

2. A portable floating wave dissipating device for reducing beach erosion during periods of high wave action against a beach or coastal area, comprising:
    a floating platform having a top and bottom surface and a leading and trailing surface;
    an exposed wave breaking surface hinge connected to, and generally coextensive with, said top surface along a leading edge of said platform defined generally by the intersection of said top and leading surfaces;
    said exposed wave breaking surface fixedly pivotable about its hinge connection between a generally upright in use orientation and a generally horizontal orientation against said top surface when not in use;
    a submerged wave breaking surface hinge connected to, and generally coextensive with, said bottom surface along a trailing edge of said platform defined generally by the intersection of said bottom and trailing surfaces;
    said submerged wave breaking surface pivotable about its hinge connection between an in use generally downward orientation and a generally horizontal orientation against said bottom surface when not in use;
    said submerged wave breaking surface having a plurality of spaced slots formed therebetween for dissipating wave action passing through said slots.

3. A portable floating wave dissipating device for reducing beach erosion during periods of high wave action against a beach or coastal area, comprising:
    a floating platform having generally parallel, relatively flat top and bottom surfaces and a leading and trailing surface;
    an exposed wave breaking surface generally coextensive with said platform and having a forward and rearward panel hinge connected one to another;
    said forward panel hinge connected to a leading edge of said platform defined by the inner section of said top and leading surfaces;
    said rearward panel releasably connectable along its distal edge to at least one mid point of said top surface whereby said forward panel is fixedly pivotal about its hinge connection to said leading edge between a generally upright in use orientation and a generally horizontal orientation against said top surface when not in use;
    a submerged wave breaking surface hinge connected to, and generally coextensive with, said bottom surface along a trailing edge of said platform defined generally by the intersection of said bottom and trailing surfaces;
    said submerged wave breaking surface pivotable about its hinge connection between an in use generally downward orientation and a generally horizontal orientation against said bottom surface when not in use;
    said submerged wave breaking surface having a plurality of spaced slots formed therebetween for dissipating wave action passing through said slots.

4. A portable floating wave dissipating device as set forth in claim 3, wherein said floating platform includes a plurality of water tight chambers which provide floatation means for said floating platform, said device further comprising:
    a removable plug connected into each said chamber whereby said device will fully submerge and sink itself when said plugs are removed.

5. A portable floating wave dissipating device as set forth in claim 4, further comprising:
    tether lines connected between each said plug and an anchor line between said floating platform and an anchor means;
    said tether line untensioned when the anchor line is taught;
    said plugs removed from said chamber by said tether line when the anchor line is disconnected from said floating platform and said device moved more than a pre-determined distance away from the anchor means.

6. A portable floating wave dissipating device as set forth in claim 4, further comprising:
a flexible, nonextendable length between said leading surface and the distal edge of said submersible wave breaking panel for holding said submerged wave breaking panel in its downward in use position against oncoming waves.

7. A portable floating wave dissipating device as set forth in claim 6, further comprising:
latch means for holding said submerged wave breaking panel in its generally horizontal orientation against said bottom surface when not in use.

8. A portable floating wave dissipating device as set forth in claim 3, further comprising:
a water directing vane disposed adjacent each said slot angle with respect to said submerged wave breaking panel such that sea water passing through each said slot is directed upwardly.

9. A portable floating wave dissipating device as set forth in claim 3, further comprising:
a water directing vane disposed adjacent each said slot angle with respect to said submerged wave breaking panel such that sea water passing through each said slot is directed downwardly.

10. A portable floating wave dissipating device as set forth in claim 3, wherein:
a plurality of said wave devices are releasably connectable and to end-to-end to form an elongated wave dissipating system.

* * * * *